United States Patent [19]

Welkey

[11] Patent Number: 4,861,077
[45] Date of Patent: Aug. 29, 1989

[54] TRAPEZOIDAL SEAL RING CONNECTION

[76] Inventor: Joseph J. Welkey, P.O. Box 40082, Houston, Tex. 77240

[21] Appl. No.: 264,824

[22] Filed: Oct. 31, 1988

[51] Int. Cl.$^4$ ............................................. F16L 25/00
[52] U.S. Cl. ............................. 285/334.1; 285/334.4; 285/363; 285/917
[58] Field of Search ................. 285/334.1, 334.4, 363, 285/368, 910, 917

[56] References Cited

U.S. PATENT DOCUMENTS

| | | |
|---|---|---|
| 340,268 | 4/1886 | Westinghouse, Jr. . |
| 805,645 | 11/1905 | Guillott . |
| 1,682,635 | 8/1928 | Smith ............................... 285/334.1 |
| 1,959,532 | 3/1932 | Hirsh . |
| 2,269,486 | 7/1941 | Santoro . |
| 2,307,440 | 11/1940 | Wilson . |
| 2,489,338 | 5/1946 | Stork et al. . |
| 3,201,154 | 8/1965 | Holmgren .................... 285/334.1 X |
| 3,843,764 | 10/1974 | Grawey et al. . |
| 4,452,474 | 0/0000 | Hanger . |
| 4,620,731 | 11/1986 | Rushing . |
| 4,648,632 | 3/1987 | Hanger . |
| 4,712,815 | 12/1987 | Reeves ............................... 285/334 |

Primary Examiner—Dave W. Arola

[57] ABSTRACT

A trapezoidal seal ring connection improved by the inclusion of a crush ring. The trapezoidal seal ring is sealingly engaged between an inwardly tapered frustoconical exterior surface of a male member, and an outwardly tapered frustoconical interior surface of a female member. The seal ring has an outer surface with an angle of taper substantially equal to that of the inner surface of the female member, and an inner surface having an angle of taper that is substantially equal to the angle of the taper of the end of the male member. As the male and female members are urged into mating engagement, the seal ring is wedged tightly therebetween to form a fluid-tight seal. The crush ring is positioned axially between the male and female members to fill the gap therebetween and to present a substantially uniform inside diameter to the flow of fluid through the connection. The crush ring is self-centered radially at an outer peripheral edge having a taper corresponding to that of the inside surface of the seal ring. A fluid pocket formed between the crush ring, the seal ring and the female member permits the seal effected by the seal ring to be energized by the pressure of the fluid in the connection.

11 Claims, 2 Drawing Sheets

TRAPEZOIDAL SEAL RING CONNECTION

FIELD OF THE INVENTION

The present invention relates to high pressure flow line connections or closures which include a male member having a tapered annular exterior surface, a female member having a tapered annular interior surface, and a seal ring of generally trapezoidal cross section positioned therebetween; and more particularly to a crush ring disposed between the male and female members adjacent to the seal ring for forming a substantially continuous surface for flow of fluid through the connection.

BACKGROUND OF THE INVENTION

Various trapezoidal seal ring connections are known from the prior art for connecting together flow lines or conduits. This arrangement generally includes a male member, a female member and a seal ring. The male member has an end with an inwardly tapered frustoconical exterior surface. The female member has an end with an outwardly tapered frustoconical exterior surface having an angle of taper with respect to the axis of the member that is less than the angle of taper of the end of the male portion. The seal ring is generally trapezoidal in cross section and has an outer surface with an angle of taper substantially equal to that of the inner surface of the female member, and an inner surface having an angle of taper that is substantially equal to the angle of taper of the end of the male member. As the male and female members are urged into mating engagement, as for example, by flanges, the seal ring is wedged tightly therebetween.

Various improvements have been made to the trapezoidal seal ring connection to enhance the proper seating of the seal ring between the mating surfaces of the male and female members. For example, trapezoidal seal rings formed to include a radially extending lip were developed for providing a visual indication of the proper alignment of the parts as the male and female members were urged into engagement. Additional modifications and improvements of the lip which have been developed include spacing of the lip from the female member and sizing of the lip, seal ring, and male and female members relative to each other such that proper axial alignment among the parts is maintained and an adequate seal is achieved. Such modified trapezoidal seal rings having radially outwardly extending lips are described in U.S. Pat. Nos. 4,452,474 and 4,648,632.

One problem which has heretofore not been addressed, as far as applicant is aware, is that the male and female members in such connections are generally spaced apart axially from each other, and the trapezoidal seal ring has a larger inside diameter than a central bore formed through the male and female members for the flow of fluid therein, such that a gap or discontinuity is created in the surface adjacent the flow of the fluid. This gap causes turbulence in the fluid flowing adjacent thereto which can in some applications result in erosion of the central bore in the male and female members in the vicinity of the gap. Accordingly, there is a need for a modification of the trapezoidal seal ring connection of the prior art to avoid the erosion which may be caused by the presence of the discontinuity between the male and female members.

SUMMARY OF THE INVENTION

The present invention solves the problem of erosion adjacent a gap formed between the male and female members in the trapezoidal seal ring connections of the prior art by providing a self-centering crush ring having an inside diameter matching that of the central bore in the male and female members to present a generally continuous surface for fluid flow therethrough.

The present invention provides an improvement in a high pressure flow line connection. The connection includes male and female tubular members in generally mating alignment with a central bore of generally uniform inside diameter for the flow of fluid therethrough, and an annular seal ring disposed between the tubular members. The male member has an annular face extending radially outwardly from the bore to a frustoconical exterior surface which is tapered from a minimum outside diameter adjacent the annular face to a maximum outside diameter spaced axially from the annular face. The female member generally has an annular shoulder extending radially outwardly from the bore to an interior frustoconical surface which is tapered from a minimum inside diameter adjacent the shoulder to a maximum inside diameter spaced axially from the shoulder. The seal ring has a frustoconical outer surface tapered to complement and sealingly engage the female member frustoconical interior surface, and an inner frustoconical surface tapered to complement and sealingly engage the male member frustoconical exterior surface. The female member shoulder is spaced axially from the male member annular face, and the seal ring has a minimum inside diameter greater than the diameter of the bore. The improvement comprises a crush ring disposed between the annular face of the male member and the shoulder of the female member. The crush ring includes an inside diameter, first and second annular faces, and an outer peripheral edge. The inside diameter matches that of the central bore and is coaxial therewith to present a generally continuous surface for fluid flow through the connection. The first annular face is substantially coextensive with the annular face of the male member for abutment therewith. The second annular face has a first portion in abutment with the shoulder of the female member adjacent the central bore, and a second portion spaced axially from the shoulder adjacent the minimum inside diameter of the interior frustoconical surface of the female member to form a fluid pocket therebetween. The outer peripheral edge forms a frustoconical surface having a taper corresponding to that of the male member exterior frustoconical surface. The frustoconical surface of the edge of the crush ring has a maximum outside diameter larger than the minimum inside diameter of the seal ring frustoconical inner surface for centering the crush ring between the male and female members.

DETAILED DESCRIPTION OF THE PREFERRED EMBODIMENTS

Figure 5:
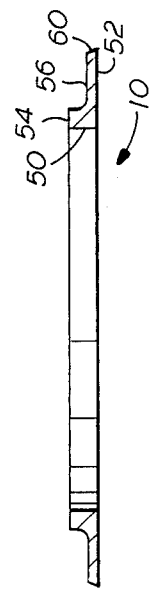
FIG. 5 is a cross sectional view of the crush ring seen in FIG. 4 along the lines 5—5.
Figure 4:
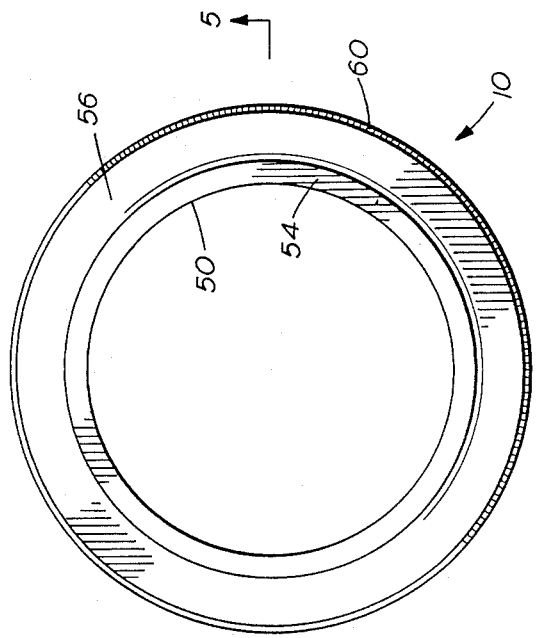
FIG. 4 is an end view of a crush ring according to the present invention.
Figure 1:
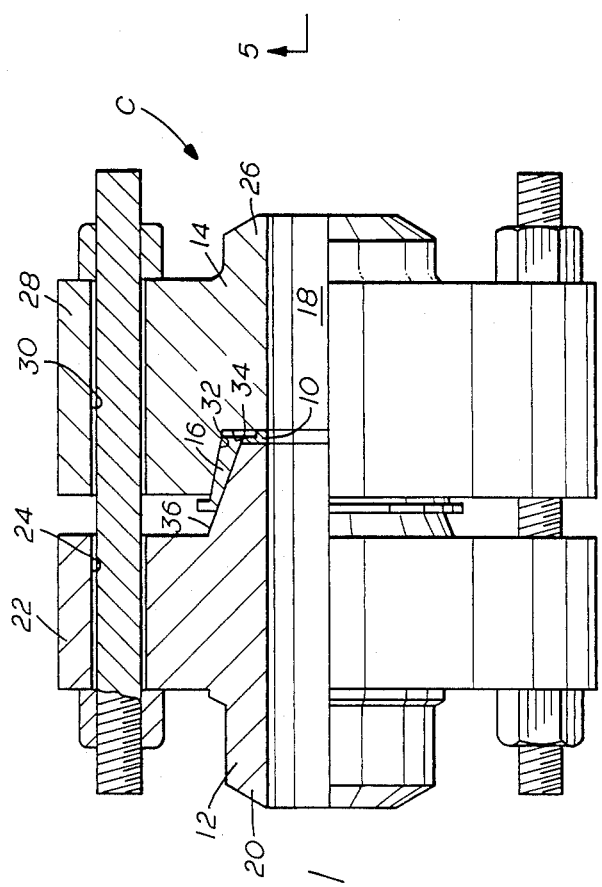
FIG. 1 is a quarter sectional view of a high pressure flow line connection incorporating the present invention.
Figure 2:
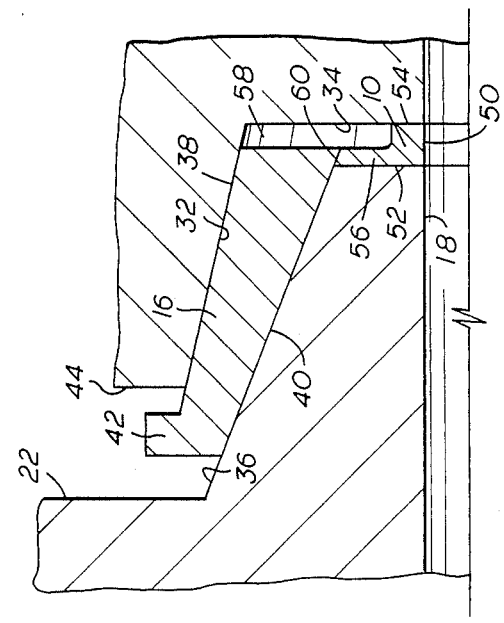
FIG. 2 is a detailed sectional view of the male member, seal ring, crush ring and female member arrangement of a preferred embodiment of the present invention in an unseated arrangement prior to tightening.

Referring now to FIGS. 1-5 in which like parts are designated by like reference numerals, crush ring 10 is disposed axially between male tubular member 12 and female tubular member 14, and disposed radially between seal ring 16 and central bore 18. The male member 12, the female member 14 and the seal ring 16 form a high pressure flow line connection C known in the prior art as a trapezoidal seal ring connection. The connection C is preferably substantially as described in U.S. Pat. No. 4,452,474, and especially as described in U.S. Pat. No. 4,648,632, the disclosures of which are hereby incorporated in reference in their entirety as though fully set forth in extenso. Briefly, male member 12 is generally tubular and adapted for connection to a high pressure conduit by welding or the like at distal end 20. The male member 12 includes a radially outwardly extending flange 22 which has a plurality of bolt holes including bolt hole 24 therein. The female member 14 is generally tubular and is adapted for attachment to a high pressure conduit as by welding or the like at distal end 26. The female member 14 includes a radially extending unitary flange 28 which has a plurality of bolt holes including bolt hole 30 therein. Flange 28 is thus adapted to be interconnected with flange 22 by a plurality of bolts or the like to thereby connect and urge axially together the male member 12 and the female member 14. The female member 14 includes a radially enlarged outwardly tapered end portion 32. The end portion 32 forms a frustoconical interior surface having an angle of taper with respect to a longitudinal axis of the bore 18. End portion 32 has a shoulder 34 which extends radially inwardly to the bore 18. The male member 12 includes an inwardly tapered end portion 36 which forms a frustoconical exterior surface. The angle of taper of the end portion 36 with respect to the longitudinal axis of the bore 18 is generally greater than the angle of taper of the end portion 32 of the female member 14. The seal ring 16 generally includes a frustoconical outer surface 38 and a frustoconical inner surface 40. The angles of taper of the outer surface 38 and the inner surface 40 are generally substantially equal to the angles of taper of the end portion 32 of the female member 14 and the end portion 36 of the male member 12, respectively. The seal ring 16 is thus wedged between the end portion 36 of the male member 12 and the end portion 32 of the female member 14. Internal pressure within the connection C may generally act on the seal ring 16 to urge the same into tighter engagement with the end portions 32 and 36, to thereby make the seal ring 16 effectively selfenergizing. Generally, the greater the internal pressure, the more effective is the seal. The seal ring 16 desirably includes a radially outwardly extending lip 42. The lip 42 is preferably poisitioned on the seal ring 16 so as to be spaced apart from the end 44 of the female member 14 and flange 22 of the male member 12, prior to final assembly (FIGS. 1 and 2). During assembly of the connection C, the installer can inspect the position of lip 42 with respect to the male member 12 and the female member 14 to verify that the spacing between the lip 42 and end 44 of female member 14 is substantially equal all the way around connection C.

The lip 42 thus provides a visual indication that the parts are properly aligned.

Figure 3:
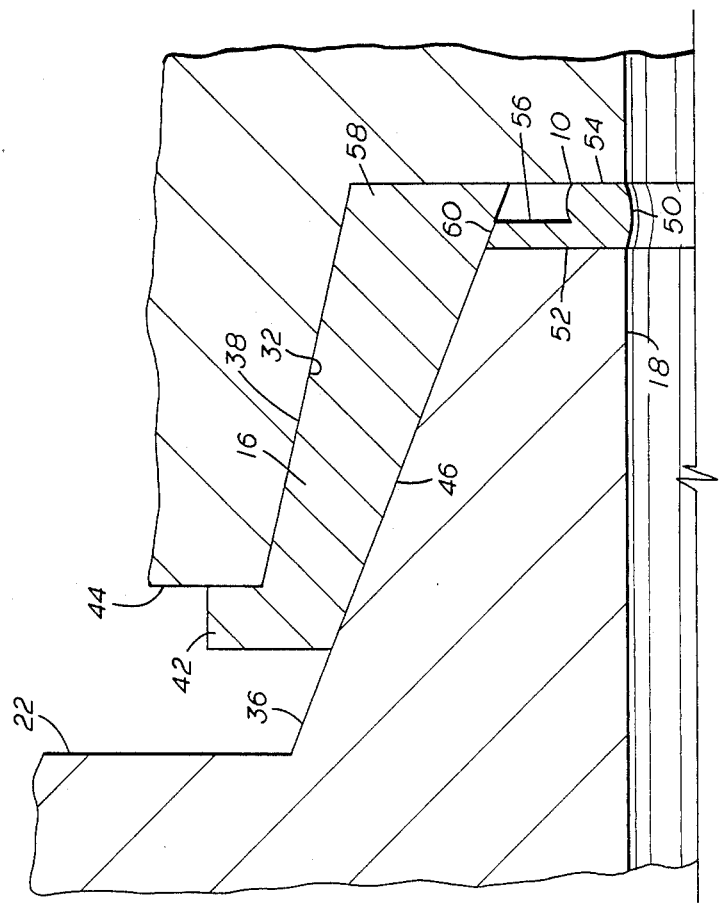
FIG. 3 is a detailed sectional view of the arrangement of FIG. 2 in the seated arrangement following tightening.

The crush ring 10 which is employed in the connection according to the present invention has an inner surface 50 having an inside diameter corresponding to that of the central bore 18. A first annular surface 52 of the crush ring 10 extends radially outwardly from the surface 50 in abutment with the male member 12 to adjacent the seal ring 16. An opposite annular surface extends radially outwardly from the surface 50 along a portion 54 in abutment with the shoulder 34 of the female member 14 to a point between the central bore 18 and the seal ring 16. A second annular face portion 56 extends radially inwardly from adjacent the first portion 54 to adjacent the seal ring 16, but is spaced axially from the shoulder 34 to form a fluid pocket 58 enclosed by the crush ring 10, the shoulder 34, the seal ring 16 and (prior to assembly after which the seal ring 16 abuts the shoulder 34, as seen in FIG. 3) the interior surface 32 of the female member 14. The crush ring 10 has an outer peripheral edge 60 which is tapered complementarily with respect to the inner surface 40 of the seal ring 16 for engagement therewith.

The connection C including the crush ring 10 is assembled by placing the seal ring 16 in the end portion 32 of the female member 14, the crush ring 10 inside the seal ring with the peripheral edge 60 in engagement with the surface 40 of the seal ring 16 and finally by inserting the male member end portion 36 into the assembly of the crush ring 10, seal ring 16 and female member 14 and tightening the connection C as appropriate. Alternatively, it will be readily appreciated that the assembly could start with the male member 14, placing the crush ring 10 on the end thereof, pressing the seal ring 16 over the crush ring 10 into engagement with the end portion 36 of the male member 12, and then by finally placing the female member 14 over the seal ring 16 and tightening the connection C.

It is not absolutely essential that the inside surface 50 of the crush ring 10 has exactly the same inside diameter as that of the central bore 18, but it will be readily appreciated that the more uniform the inside diameter of the bore 18 and the crush ring 10, generally the less turbulence which will be introduced into the fluid flowing therethrough, and hence the less erosion resulting therefrom. The crush ring 10 is desirably made of a softer or more readily deformable material than the seal ring 16 and the tubular members 12, 14. This is desired in order to avoid any interference due to the crush ring 10 in effectuating the seal with the seal ring 16. In this regard, the radial dimension of the surface 54 need be no greater than that necessary to fill the axial gap between the male member 12 and the female member 14, and is desirably less than the axial dimension of the surface 56 to facilitate any deformation of the crush ring 10 in the axial dimension so that the seating of the seal ring 16 is not adversely affected by the presence of the crush ring 10 (see FIG. 3). It is also noted that the crush ring 10 is not necessarily designed to effect any type of seal between the male member 12 and the female member 14. The radial extent of the surface 54 should be less than that of the surface 52, however, such that any leakage of fluid from the central bore 18 past the crush ring 10 will be directed into the fluid pocket 58 so that the self-energizing enhancement of the seal formed by the seal ring 16 as described above will be effectuated.

The tapered edge 60 of the crush ring 10 is also a significant feature of the present invention. The tapering of the edge 60 achieves a self-centering of the crush ring 10 so that the surface 50 will be properly positioned flush with the central bore 18 all the way around the connection C.

The foregoing description of the invention is illustrative and explanatory thereof. Various changes in the dimensions, shapes and materials of construction will occur to those of skill in the art. It is intended that all such variations within the scope and spirit of the appended claims be embraced thereby.

I claim:

1. In a high pressure flow line connection, including male and female tubular members in generally mating alignment with a central bore of generally uniform inside diameter and an annular seal ring disposed between said tubular members, and means for urging said male and female tubular members axially toward each other, where in the male member has an annular face extending radially outwardly from the bore to a frustoconical exterior surface which is tapered from a minimum outside diameter adjacent said annular face to a maximum outside diameter spaced axially from said annular face, wherein the female member has an annular shoulder extending radially outwardly from said bore to an interior frustoconical surface which is tapered from a minimum inside diameter adjacent said shoulder to a maximum inside diameter spaced axially from said shoulder, wherein the seal ring has a frustoconical outer surface tapered to complement and sealingly engage said interior female member frustoconical interior surface and an inner frustoconical surface tapered to complement and sealingly engage said male member frustoconical exterior surface, wherein the female member shoulder is spaced axially from the male member annular face, and wherein the seal ring frustoconical inner surface has a minimum inside diameter less than the minimum inside diameter of the male member exterior frustoconical surface, the improvement comprising a crush ring disposed between the annular face of the male member and the shoulder of the female member, wherein the crush ring comprises:
   an inside diameter matching that of the central bore and coaxial therewith to present a generally continuous surface for fluid flow therethrough;
   a first annular face substantially coextensive with said annular face of the male member for abutment therewith;
   a second annular face having a first portion in abutment with said shoulder of the female member adjacent said central bore and a second portion spaced axially from said shoulder adjacent said minimum inside diameter of the interior frustoconical surface of the seal ring to form a fluid pocket therebetween; and
   an outer peripheral edge forming a frustoconical surface having a taper corresponding to that of the male member exterior frustoconical surface, the frustoconical surface of the edge having a maximum outside diameter larger than the minimum inside diameter of the seal ring frustoconical inner surface for centering of the crush ring between the male and female members.

2. The improvement of claim 1 wherein the crush ring is made of a material which is softer than the material of the seal ring.

3. The improvement of claim 1 wherein the outer peripheral edge of the crush ring has an axial dimension corresponding to the axial dimension from the annular face of the male member to annular face of the seal ring adjacent the minimum inside diameter of the seal ring inner frustoconical surface.

4. The improvement of claim 1, wherein the maximum outside diameter of the outer peripheral edge of the crush ring is no greater than the minimum outside diameter of the male member frustoconical exterior surface.

5. The improvement of claim 1, wherein the crush ring deforms against before the male member annular face and the female member shoulder under axial compression.

6. The improvement of claim 1, wherein the surface area of the first portion is greater than the surface area of the second portion of the second face of the crush ring.

7. A trapezoidal seal ring connection, comprising:
   a male tubular member having an annular face extending from an axial bore therethrough to a minimum outside diameter of a frustoconical exterior surface tapered axially from said minimum outside diameter to a maximum outside diameter;
   a female tubular member having an axial bore coaxial with and having substantially the same diameter as said male member axial bore, and a shoulder axially spaced from said male member annular face and extending radially from said bore to a minimum inside diameter of a frustoconical interior surface tapered from said minimum inside diameter to a maximum inside diameter;
   means for urging said male and female tubular members axially toward each other;
   a seal ring having an inner frustoconical surface tapered from a minimum inside diameter to a maximum inside diameter, a substantial portion of which is adapted to sealingly engage said male member frustoconical exterior surface, said seal ring inner surface minimum inside diameter being less than said minimum outside diameter of said male member frustoconical surface, and an outer frustoconical surface tapered from a minimum outside diameter to a maximum outside diameter, a substantial portion of which is adapted to sealingly engage said female member frustoconical interior surface; and
   a crush ring disposed between said male member annular face and said female member shoulder, said crush ring having an inside face coaxial with and having substantially the same diameter as said male and female member bores, said inside face extending axially from adjacent said male member annular face to adjacent said female member shoulder to present a continuous surface for the flow of fluid through said bores, and an outer peripheral edge tapered from a minimum outside diameter to a maximum outside diameter, said peripheral edge maximum outside diameter being not greater than said male member exterior surface minimum outside diameter and not less than said seal ring inner surface minimum inside diameter for concentrically aligning said crush ring with respect to said bores.

8. The connection of claim 7, wherein said crush ring has an annular face extending radially outwardly from said crush ring inside face to said maximum outside diameter of said peripheral edge for abutment with said male member annular face.

9. The connection of claim 7, wherein said crush ring has an annular face extending radially outwardly from adjacent said inside face for abutment with said female member shoulder.

10. The connection of claim 9, wherein said crush ring annular face is deformable against said female member shoulder under axial compression.

11. The connection of claim 7, wherein said crush ring has an annular face extending radially inwardly from said peripheral edge minimum outside diameter and spaced axially from said female member shoulder, and wherein a radial end of said seal ring between said minimum outside diameter of said seal ring outer surface and said minimum inside diameter of said seal ring inner surface is a spaced axially from said female member shoulder to form a fluid pocket therebetween for receiving fluid from said bores which leaks past said crush ring.

* * * * *